US011822618B2

(12) United States Patent
Rafey et al.

(10) Patent No.: US 11,822,618 B2
(45) Date of Patent: Nov. 21, 2023

(54) SYSTEM AND METHOD FOR PROFILING FOR MICROSEGMENTATION BASED ON UNIQUE SIGNATURE OF A DEVICE

(71) Applicant: DELL PRODUCTS, LP, Round Rock, TX (US)

(72) Inventors: Mohammad Rafey, Bangalore (IN); Hung The Dinh, Austin, TX (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 587 days.

(21) Appl. No.: 17/008,361

(22) Filed: Aug. 31, 2020

(65) Prior Publication Data

US 2022/0067123 A1 Mar. 3, 2022

(51) Int. Cl.
| | |
|---|---|
| *G06F 17/18* | (2006.01) |
| *G06N 5/04* | (2023.01) |
| *G06F 16/2458* | (2019.01) |
| *G06N 20/00* | (2019.01) |
| *H04L 29/06* | (2006.01) |
| *H04L 9/40* | (2022.01) |

(52) U.S. Cl.
CPC .......... *G06F 17/18* (2013.01); *G06F 16/2462* (2019.01); *G06N 5/04* (2013.01); *G06N 20/00* (2019.01); *H04L 63/20* (2013.01)

(58) Field of Classification Search
CPC . G06F 16/2462; G06F 17/18; H04L 63/0876; H04L 63/1425; H04L 63/20; G06N 5/04; G06N 20/00; G06N 3/044; G06N 3/063; G06N 3/08
See application file for complete search history.

(56) References Cited

U.S. PATENT DOCUMENTS

| | | | |
|---|---|---|---|
| 9,384,444 B2 | 7/2016 | Kortum et al. | |
| 10,116,674 B2* | 10/2018 | Baradaran | H04L 63/1416 |
| 10,616,257 B1* | 4/2020 | Soulhi | H04L 63/1425 |

(Continued)

FOREIGN PATENT DOCUMENTS

EP 3767467 A1 * 1/2021 ............ G06F 11/00

*Primary Examiner* — Joseph P Hirl
*Assistant Examiner* — Thomas A Gyorfi
(74) *Attorney, Agent, or Firm* — Larson Newman, LLP

(57) ABSTRACT

A method may include receiving data from a device within a network, wherein the data is associated with one or more features of the device, and determining a subset of the features of the device that is associated with a runtime behavior of the device. The method may also perform a univariate analysis on a feature dataset that is associated with the subset of the features of the device, perform a multivariate analysis on the feature dataset that is associated with correlated features in the subset of the features, and generate a device signature based on the univariate analysis and the multivariate analysis. The method may also generate a predictive model based on the device signature, wherein the predictive model is trained on historical data of devices in the network, generate a device profile based on the predictive model that may be used to determine a device type and the runtime behavior of the device, and determine a segment of the network associated with the device based on the device type and the runtime behavior of the device.

20 Claims, 10 Drawing Sheets

(56) References Cited

U.S. PATENT DOCUMENTS

| | | | |
|---|---|---|---|
| 11,608,524 B1* | 3/2023 | Venturelli | G16B 30/00 |
| 2011/0022355 A1* | 1/2011 | Cecchi | G06F 18/29 |
| | | | 702/182 |
| 2016/0359886 A1* | 12/2016 | Yadav | H04L 63/1425 |
| 2017/0230392 A1* | 8/2017 | Dean | G06F 21/552 |
| 2017/0339178 A1* | 11/2017 | Mahaffey | H04L 41/142 |
| 2018/0212844 A1 | 7/2018 | Quinn et al. | |
| 2018/0234326 A1 | 8/2018 | Swierk et al. | |
| 2020/0118100 A1 | 4/2020 | Rao | |

* cited by examiner

700

Device Type = DT-A ⌒705

Feature Set = FS-A ⌒710
Endpoint.Egress.Storage
Telemetry.Ingress.Protocol
Messages.Expired
Devices.Connected.Protocol
Telemetry.Egress.Success
Telemetry.Egress.Dropped
Telemetry.Egress.Orphaned
Endpoint.Latency.Eventhub
} 715

| Device Identifier = IOT-1234 ⌒805 | Device Type = DT-A ⌒810 | | | Feature Set = FS-A ⌒815 | | | | ⌒820 |
|---|---|---|---|---|---|---|---|---|
| Date/Time | Endpoint.Egress.Storage | Telemetry.Ingress.Protocol | Messages.Expired | Devices.Connected.Protocol | Telemetry.Egress.Success | Telemetry.Egress.Dropped | Telemetry.Egress.Orphaned | Endpoint.Latency.Eventhub |
| 1/1/20 1:00 | 45 | 34 | 65 | 23 | 23 | 34 | 56 | 98 |
| 1/1/20 1:05 | 35 | 23 | 76 | 45 | 43 | 54 | 54 | 56 |
| 1/1/20 1:10 | 23 | 54 | 54 | 34 | 54 | 34 | 23 | 34 |
| ... | | | | | | | | |
| 1/1/20 23:50 | 78 | 65 | 43 | 76 | 65 | 56 | 87 | 65 |
| 1/1/20 23:55 | 98 | 76 | 23 | 23 | 34 | 34 | 23 | 43 |
| 1/2/20 1:00 | 34 | 23 | 45 | 87 | 23 | 34 | 23 | 23 |
| 1/2/20 1:05 | 67 | 98 | 87 | 23 | 65 | 65 | 66 | 87 |
| 1/2/20 1:10 | 23 | 78 | 66 | 43 | 66 | 87 | 54 | 54 |
| ... | | | | | | | | |
| 1/2/20 23:50 | 34 | 65 | 76 | 66 | 76 | 98 | 76 | 43 |
| 1/2/20 23:55 | 23 | 23 | 65 | 65 | 23 | 56 | 23 | 65 |

825 } (rows 1/1/20 1:00 – 1/1/20 23:55)
830 } (rows 1/2/20 1:00 – 1/2/20 23:55)

*FIG. 8*

| Device Identifier = IOT-1234 ⌒ 905 | | Device Type = DT-A ⌒ 910 | | Feature Set = FS-A ⌒ 915 | | | |
|---|---|---|---|---|---|---|---|
| Endpoint.Egress.Storage | Telemetry.Ingress.Protocol | Messages.Expired | Devices.ConnectedProtocol | Telemetry.Egress.Success | Telemetry.Egress.Dropped | Telemetry.Egress.Orphaned ⌒ 920 | Endpoint.Latency.Eventhub |
| 24.07375030 | 19.86012 | 22.90874519 | 23.55265 | 24.392 | 21.44973 | 24.56947478 | 23.55265 ⌒ 935 |
| 24.8407046 | 24.57317 | 21.86251808 | 25.55327 | 24.32918 | 22.69294 | 23.16221038 | 25.25806 ⌒ 940 |

SYSTEM AND METHOD FOR PROFILING FOR MICROSEGMENTATION BASED ON UNIQUE SIGNATURE OF A DEVICE

FIELD OF THE DISCLOSURE

The present disclosure generally relates to information handling systems, and more particularly relates to device profiling for microsegmentation based on the device's unique signature.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method may include receiving data from a device within a network, wherein the data is associated with one or more features of the device, and determining a subset of the features of the device that is associated with a runtime behavior of the device. The method may also perform a univariate analysis on a feature dataset that is associated with the subset of the features of the device, perform a multivariate analysis on the feature dataset that is associated with correlated features in the subset of the features, and generate a device signature based on the univariate analysis and the multivariate analysis. The method may also generate a predictive model based on the device signature, wherein the predictive model is trained on historical data of devices in the network, generate a device profile based on the predictive model that may be used to determine a device type and the runtime behavior of the device, and determine a segment of the network associated with the device based on the device type and the runtime behavior of the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7 is a list of features illustrating an example of a feature set;

FIG. 8 is a dataset illustrating an example of data associated with the feature set;

FIG. 9 is a dataset illustrating an example of standard deviation series associated with the dataset;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
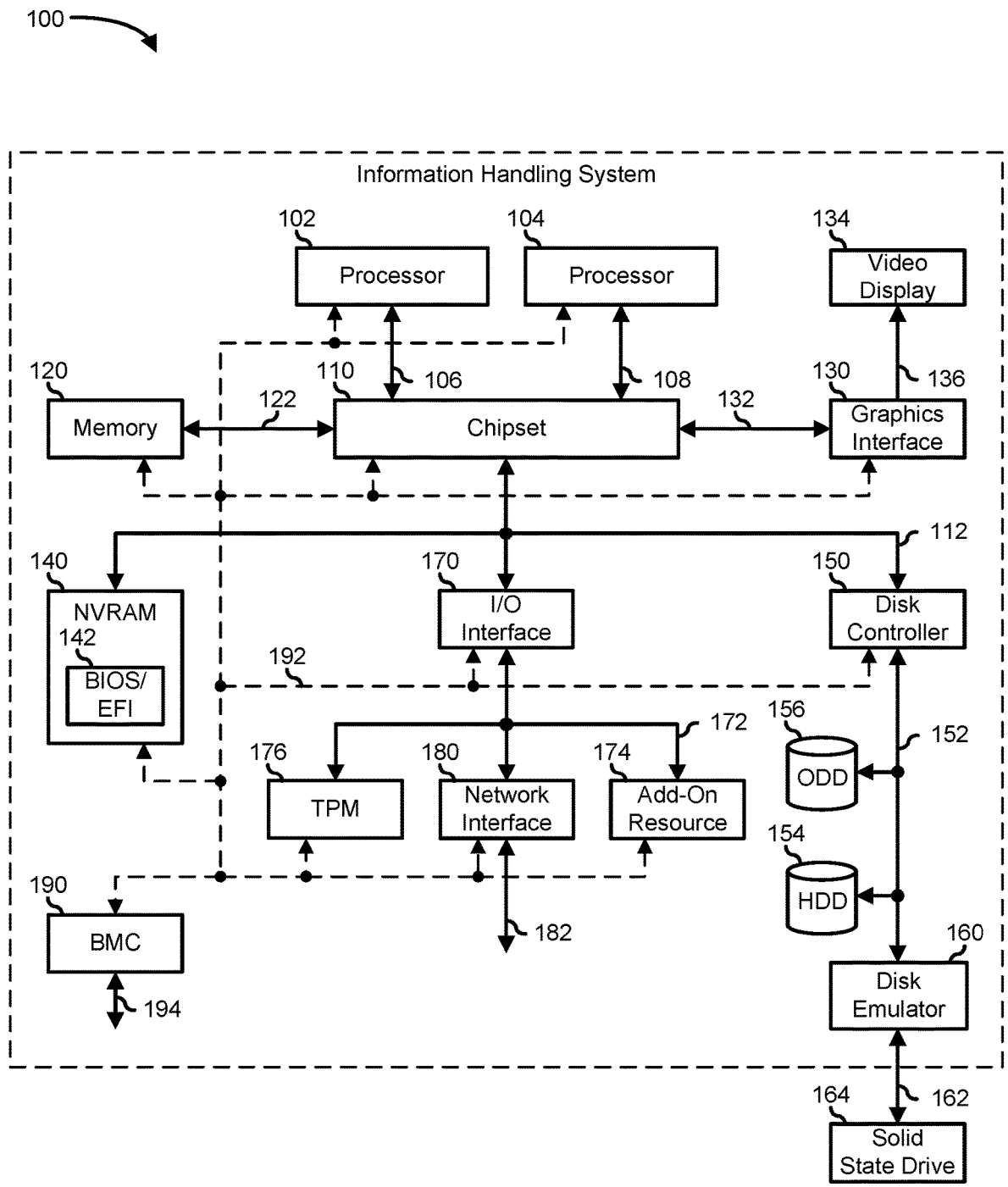
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Network segmentation offers an effective solution to improve performance and security for Internet of Things (IoT) mobile networks. However, it lacks a robust solution that can expediently perform device identification with continuous, real-time device analysis to factor in the constantly changing device vulnerabilities, risks, and other fluid characteristics that indicate the current security status of a device. In microsegmentation, devices are logically divided into distinct segments which would allow an administrator to secure the network at a more granular level. For example, microsegmentation stops the lateral movement of exploits in east-west network traffic flow within a data center. Also, microsegmentation reduces the attack surface inside the perimeter, in case of a security breach. In addition, microsegmentation operates at the device connectivity layer through software implementation, so policies follow the endpoints across the network when they move.

The present disclosure includes a novel system and method for artificial intelligence/machine learning IoT based device profiling for microsegmentation based on a device's unique signature. The device profiling utilizes a hybrid of Pearson correlation and deep learning long short-term memory (LSTM) and Sigmoid logistics to uniquely identify devices based on their characteristics and classify them into the right segment in real-time while factoring the constantly changing device vulnerabilities, risks, and other fluid characteristics that indicate the current security status of a device. This forms the basis for IoT network microsegmentation as disclosed.

Figure 2:
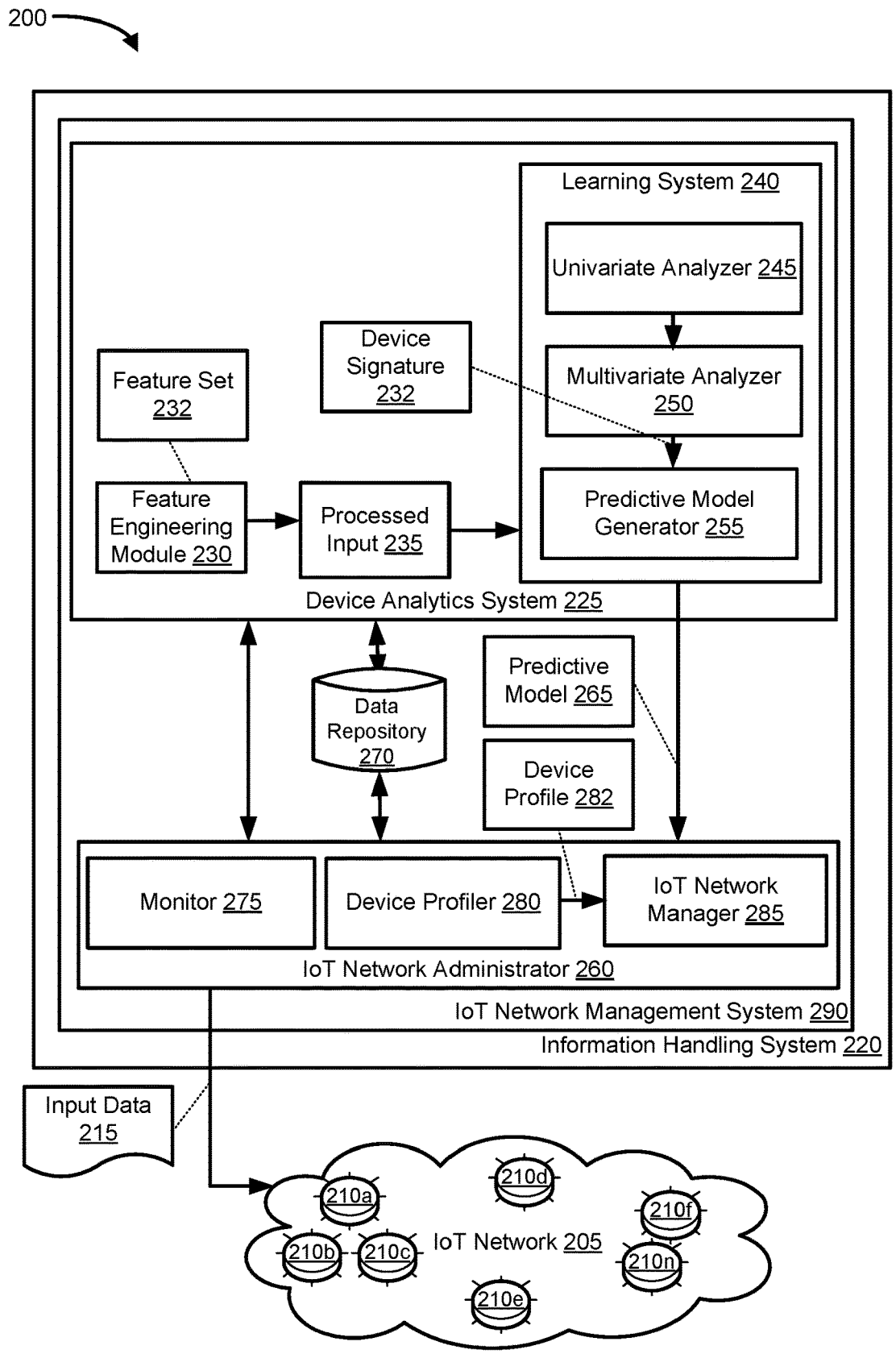
FIG. 2 is a block diagram illustrating an example of a system for device profiling for microsegmentation based on the device's unique signature.

FIG. 2 shows an example of a system 200 for device profiling used for microsegmentation based on the device's unique signature. System 200 includes IoT network 205 and information handling system 220 which is similar to information handling system 100 of FIG. 1. System 200 includes an IoT network management system 290 that includes a device analytics system 225, an IoT network administrator 260, and a data repository 270.

IoT network 205 may be a collection of interconnected devices that communicate with other devices without human intervention. The interconnected devices may be in the thousands of heterogeneous IoT devices and edge devices collectively referred herein as devices. There are different configurations possible of the devices in any given IoT network. Thus, it is often desirable that a given IoT network such as IoT network 205 remain flexible, so that new and different devices, gateways, switches, access points, servers, services, etc. may be added, updated, removed, or replaced, as the IoT network evolves over time. Devices 210a to 210n may be inventoried, evaluated, classified, and/or segmented based on their device profile such as device profile 282. The device profile may be based on network types, transience, location, etc. Although the techniques herein apply to IoT network 205, it is understood that the same techniques apply to other IoT networks.

IoT network management system 290 may be configured to perform or optimize microsegmentation of an IoT network infrastructure such as IoT network 205, enabling organizations to enforce granular unit-level controls implemented by high-level policy objects based on device type, threat levels, usage patterns, and other device profile characteristics. IoT network management system 290 may also be configured to manage and orchestrate a device life cycle such as to identify, onboard, and secure the device.

IoT network administrator 260 may be configured to monitor, manage, and/or control IoT network 205 including devices 210a to 210n. IoT network administrator 260 includes a monitor 275, a device profiler 280, and an IoT network manager 285. Monitor 275 collects or receives data from IoT network 205 such as input data 215. Input data 215 may be a dataset that may include instrumentation and observation data of devices 210a to 210n. The dataset may describe the capabilities, features, network requirements, etc. of devices 210a to 210n. The instrumentation and observation data may be received, collected, and/or resampled periodically or continuously.

Device analytics system 225 may be configured to generate a unique device signature such as device unique signature 252 by statistically analyzing device behavior patterns using standard deviation measurements and covariance analysis with the Pearson correlation method. The device signature may be generated based on feature set metrics patterns and is intended to uniquely identify devices and their types. Device analytics system 225 may then generate a predictive module such as predictive model 265 that is transmitted to device profile 280. Device analytics system 225 includes a feature engineering module 230 and a learning system 240.

Feature engineering module 400 may be configured to receive input data 215 from IoT network administrator 260 of FIG. 2 and pre-processes the received input resulting in processed input 235. Feature engineering module 230 may be configured to identify device features in input data 215 that may be utilized to describe the runtime behavior of a device. Features selected such as model, configuration, manufacturer, or standard configuration may be based on the type of the device. For each device type, the system will determine a specific set of features that can be grouped and modeled for analyzing the standard deviation pattern. This set or group features is referred to herein as a "feature set." The feature set may be used to generate a combined deviation pattern that can be used to differentiate devices.

Feature engineering module 230 may be configured to pre-process input data 215 based on the feature set 232 generating processed input 235 which includes data associated with the feature set. Feature engineering module 230 can impute missing or desired values of inputs, features, and attributes, remove outlier values that are not needed, and convert input values such as from numerical to categorical. Processed input 235 may be transmitted to learning system 240 for analysis.

Learning system 240 includes a univariate analyzer 245, a multivariate analyzer 250, and a predictive model generator 255. Learning system 240 may be configured to receive pre-processed inputs such as processed input 235 which may include a feature set, a feature dataset, etc., from feature engineering module 230. Learning system 240 may be configured to apply artificial intelligence and/or machine learning techniques to processed input 235 to generate predictive model 265. Predictive model 265 may be used to determine the device type of one or more devices which may be used to determine, change, modify, or improve the microsegmentation of devices in IoT network 205. The device type may be used to determine which segment a device belongs to.

Univariate analyzer 245 may be configured to perform an analysis of the data based on the standard deviation pattern. For each feature in the feature set received from the first phase, the system may compute a standard deviation (o) for each chunk of the data. Each chunk of data may have been a result of grouping data based on related concepts that may aid in gaining insight and making predictions. For example, each chunk may be sliced according to a time interval such as hourly, daily, weekly, etc. The system may calculate a standard deviation value series for the data chunks. Each feature will have a separate standard deviation value series and the combined series of full feature set will form a unique pattern. The unique pattern along with a covariance pattern generated by a multivariate analyzer may form the basis of a device's unique signature.

Figure 4:
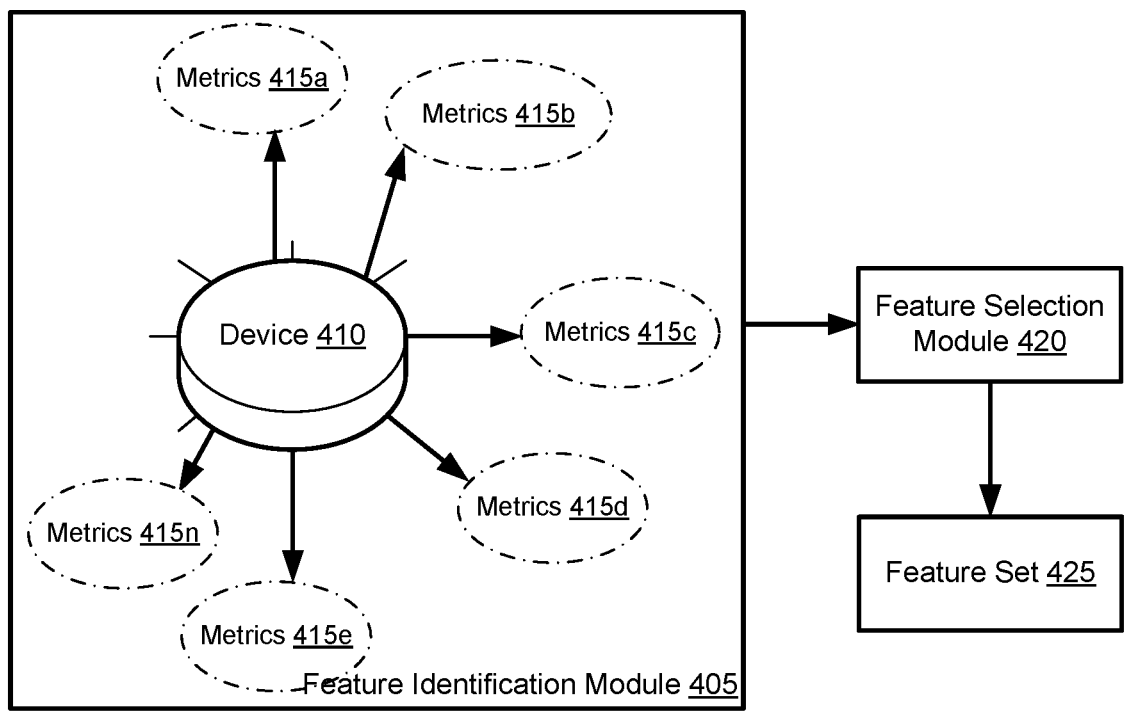
FIG. 4 is a block diagram illustrating an example of a system for extracting features of a device.

Multivariate analyzer 250 may perform covariance or multivariate analysis on processed input 235. In particular, multivariate analyzer 250 may perform a multivariate linear regression wherein a determination is made as to the contribution of the values of particular features as to values of other features, such as covariance analysis of the value of feature "X" which correlates to a value of feature "Y". For each correlated pair of features in the feature set, the multivariate analyzer 250 may be configured to capture unique behavior based on the covariance analysis using the Pearson correlation method. For example, based on the correlation of features as shown in FIG. 4, the value associated with feature F1 and F2 may be calculated. Each correlated pair of features will have a separate value series which may be used to generate a covariance pattern.

A device unique signature 252 also referred to as a device signature may be generated based on the analysis of univariate analyzer 245 and multivariate analyzer 250. Device unique signature 252 may be unique to a particular device type or device and may be used to determine whether it matches or is similar to a historical device signature. As such, device unique signature 252 may be used by predictive model generator 255 to generate a predictive model similar to predictive model 1135 of FIG. 11. Predictive model generator 255 may be configured to generate and/or train predictive model 265 to predict probabilities of device profile characteristics using machine deep learning techniques such as long short-term memory and sigmoid logistics.

Device profiler 280 may be configured to receive predictive model 265 from learning system 240. Predictive model 265 may be a trained machine learning model that may be used by device profiler 280 to analyze a feature dataset to generate a device profile such as device profile 282 based on current and/or future feature sets. The device type may be used to identify the device along with its vulnerabilities, risks, and other characteristics. Device profiler 280 may transmit device profile 282 to IoT network manager 285. This device profiling mechanism then forms the basis for IoT network microsegmentation based on device type, threat levels, usage patterns, and other profile characteristics.

IoT network manager 285 may use device profile 282 along with other information associated with the device such as its vulnerabilities, risks, and other characteristics to manage IoT network 205. For example, IoT network manager 285 may determine an applicable security policy and/or rule based on the received device profile 282 and the other information such as threat levels, usage patterns, and other characteristics to secure the devices in IoT network 205. IoT network manager 285 may also segment or microsegment devices 210a to 210n in IoT network 205 and/or optimize the current segmentation or microsegmentation of the devices.

Data repository 270 may be persistent a data storage device such as a solid-state disk, a hard disk drive, a magnetic tape library, an optical disk drive, a magneto-optical disk drive, a compact disk drive, a compact disk array, disk array controllers, and/or any computer-readable medium operable to store data. Data repository 270 may be configured to store various inputs and/or outputs of IoT network management system. For example, data repository 270 may be configured to store security policies, input datasets, feature datasets, feature set, device signature, predictive model, device profile, etc.

Figure 3:
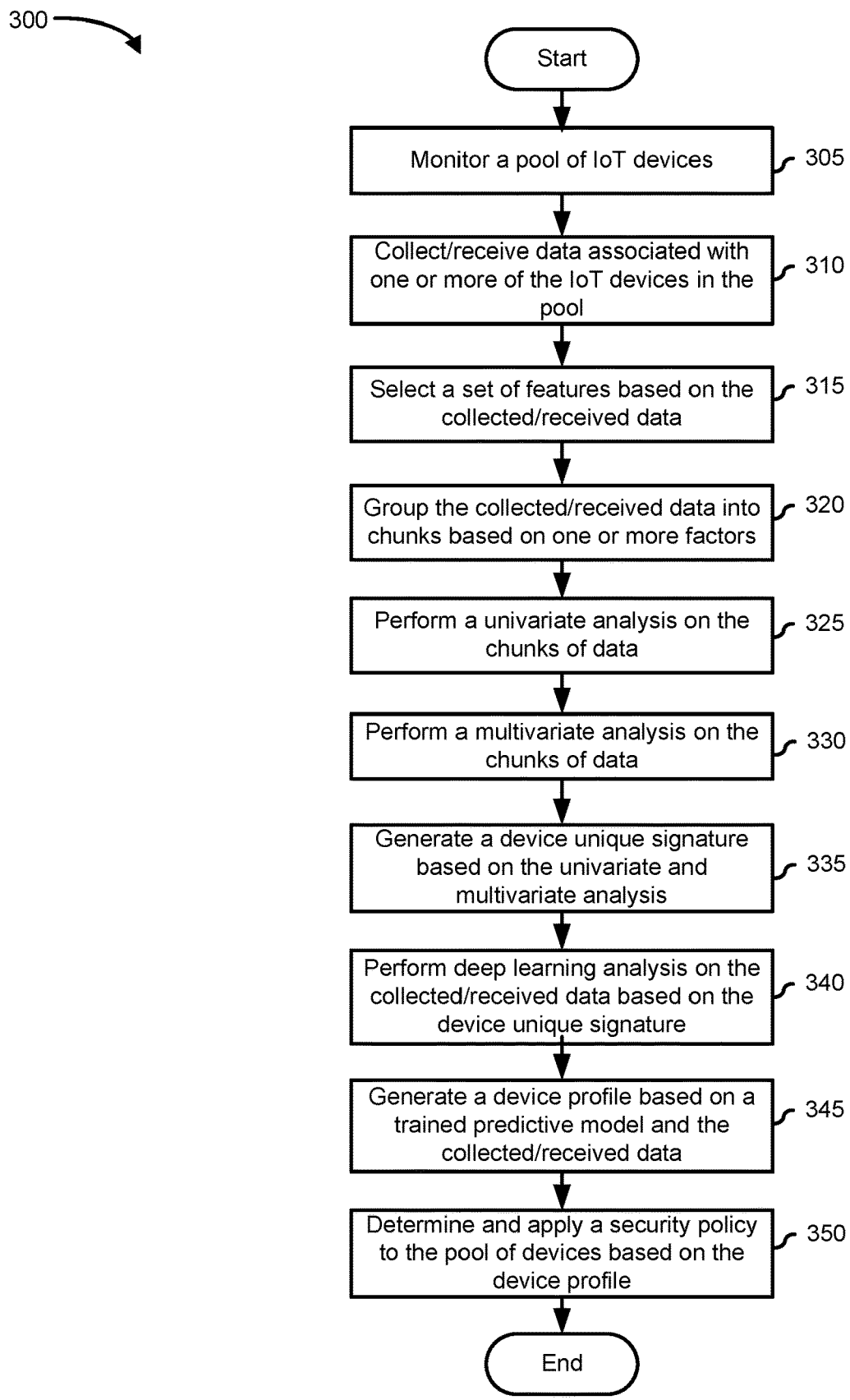
FIG. 3 is a flowchart illustrating a method for device profiling for microsegmentation based on the device's unique signature.

FIG. 3 shows a flowchart of a method 300 for device profiling used for microsegmentation based on the device's unique signature. Method 300 may be performed by IoT network management system 290 of FIG. 2 and typically starts at block 305. While embodiments of the present disclosure are described in terms of one or more components of information handling system 220 of FIG. 2, it should be recognized that other systems may be utilized to perform the described method.

Method 300 typically starts at block 305 where the method monitors and manages a pool of devices. At block 310 the method collects or receives data from one or more devices. Prior to receiving the current data, the method may have collected historical data associated with the pool of devices for a period of time. The method proceeds to block 315 where the method selects a set of features related to the runtime behavior or other attributes based on the collected and/or received data. The method may also determine correlations between the features in the feature set. The method proceeds to block 320 where the method may divide or group the collected and/or received data into chunks based on one or more factors such as the location of the device associated with the data and/or date/time the data was received.

The method proceeds to block 325 where the method performs a univariate analysis on the data chunks based on the set of features. During the analysis, the method may perform calculations of standard deviation for each feature in the data chunks. The method proceeds to block 330 where the method performs a multivariate analysis based on covariance and Pearson correlation methods. The analysis may be performed on the data chunks based on correlated features in the set of features in the data chunks. The method proceeds to block 335 where the method determines a device unique signature associated with the runtime behavior of the device based on the univariate and multivariate analysis.

The method proceeds to block 340 where the method performs deep learning analysis on the collected/received data based on the device's unique signature and a predictive model that may have been trained on historical data. The method proceeds to block 345 where the method generates a device profile based on the device's unique signature, the trained predictive model, and the collected and/or received data or a subset thereof such as the feature dataset. The device profile may be associated with the runtime behavior of the device and may be used to determine its device type. The method proceeds to block 350 where the method may determine and apply a security policy to the pool of devices based on the device profile.

FIG. 4 shows a feature engineering module 400 used to identify and select features that are relevant to the runtime behavior of the device type. Feature engineering module 400 is similar to feature engineering module 230 of FIG. 2 and is a more detailed illustration of block 315 of FIG. 3. Feature engineering module 400 includes a feature identification module 405 and a feature selection module 420.

Feature identification module 405 may be configured to identify features from information or metrics associated with device 410 such as metrics 415a to metrics 415n. The metrics may be indicative of various features of device 410 such as performance, resource utilization, battery discharge, firmware information, functional data, etc. In one embodiment, metrics 415a may include functional data associated with device 410 such as the number of egress dropped or orphaned; metrics 415b may include data associated with the power consumption of device 410; metrics 415c may include data associate with discharge the battery of device 410, and metrics 415d may include data associated with the firmware of device 410 while metrics 415e may include data associated with the charge level of the battery of device 410.

Feature selection module 420 may be configured to select an optimal set of features that will be used for the analysis of the runtime behavior of device 410. Feature selection module 420 may use at least one feature selection criterion to select the features that would result in a higher chance of determining a unique runtime behavior per feature of a device. The selected features may be included in a feature set 425.

Figure 5:
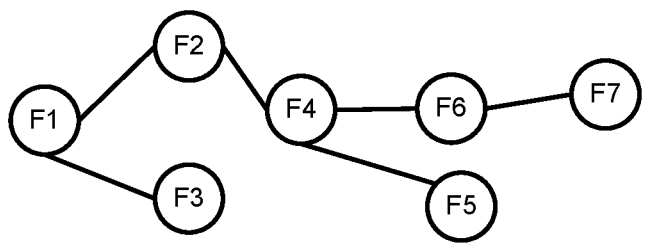
FIG. 5 is an example of a dependency graph representing dependencies of device features.

FIG. 5 shows a feature dependency graph 500 for the set of features such as feature set 425. In this example, the feature set includes features F1, F2, F3, F4, F5, F5, and F7 which may be similar to the features identified and selected from metrics 415a to 415n of FIG. 4. Feature dependency graph 500 may be generated using one or more feature engineering techniques such as principal component analysis. The features are connected by edges that denote a dependency or correlation between the connected features. Here, F1 is correlated to F3 and F2. F2 is correlated to F4 which is correlated to F5 and F6. F6 is correlated to F7. Features that are not connected are not correlated. For example, F3 is not correlated to F3 or F4 and F5 is not correlated to F7. A feature that is correlated to another feature may be affected by the change of the other feature. A feature that is not correlated to another feature may not be affected by the change of the other feature. The correlation may be such that an increase in the value of a first feature increases the value of a second feature. The correlation may also be such that an increase in the value of the first feature decreases the value of the second feature.

Figure 6:
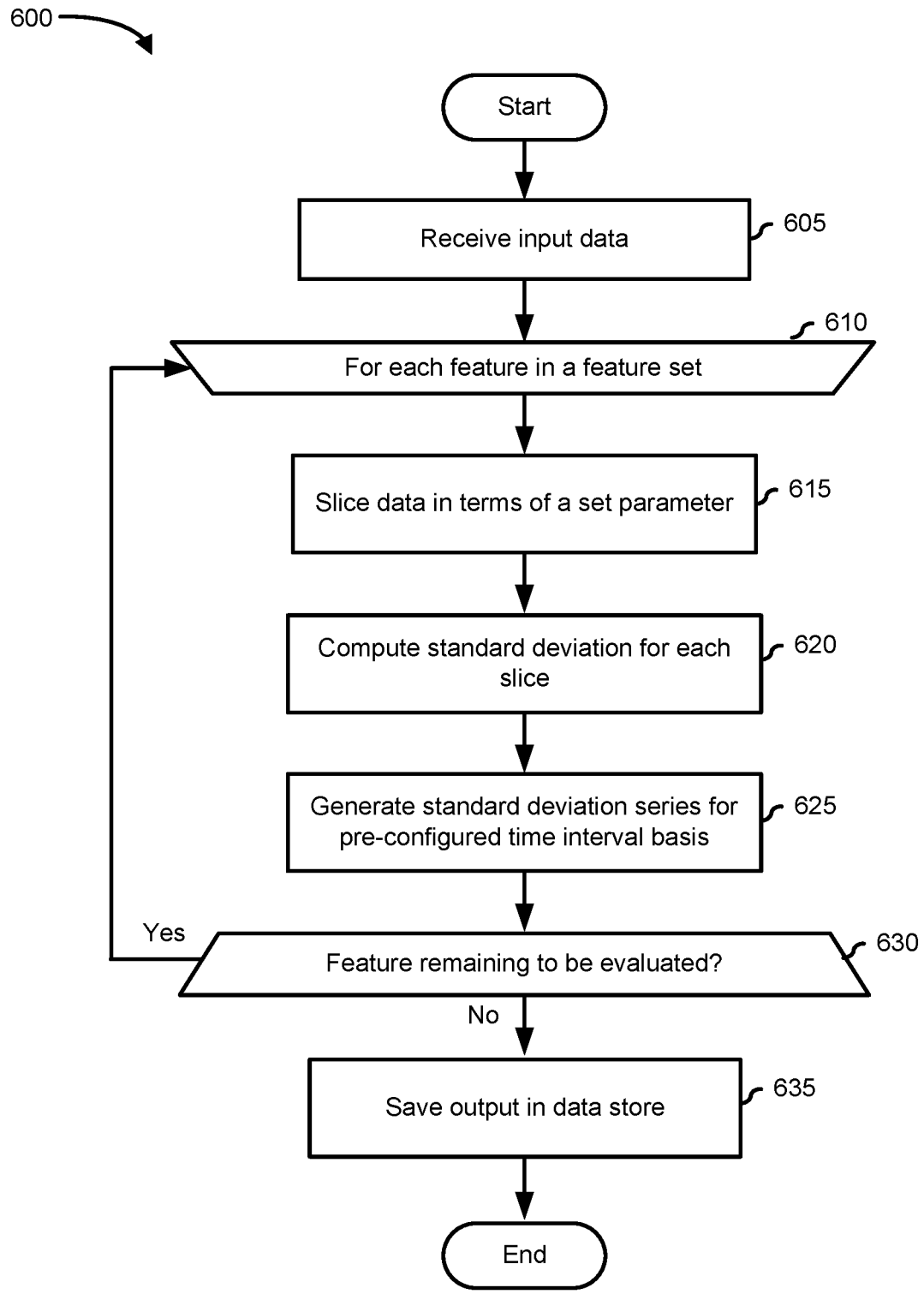
FIG. 6 is a flowchart illustrating a method for analyzing a dataset based on a standard deviation pattern.

FIG. 6 shows a flowchart of method 600 for analyzing the data collected using a standard deviation pattern. Method 600 may be a detailed illustration of block 325 of FIG. 3 and may be performed by univariate analyzer 245 of FIG. 2. While embodiments of the present disclosure are described in terms of one or more components of information handling system 220 of FIG. 2, it should be recognized that other systems may be utilized to perform the described method. Method 600 typically starts at block 605.

At block 605, the method receives input data from the feature engineering module. In particular, the input data received may be similar to feature dataset 800 of FIG. 8. The input data may be structured, semi-structured, or unstructured. For example, the received input data may be in a comma-separated file format, in an extensible markup language (XML) based file format, a binary file format, etc. The method may proceed to block 610 where each feature in the received input data is analyzed. The method may traverse the received input as structured, or rearrange the data based on various factors such as features, date, and/or time.

The analysis may include block 615, block 620, and block 625. At block 615, the method may group or slice the data into chunks according to a parameter. In particular, the data may be sliced in terms of sample size "N" which may be pre-configured. For example, the data may be sliced into data chunks based on attributes such as date/time. At block 620, the method may calculate the standard deviation of each feature in the data chunks 825 and 830 as shown in FIG. 8. The calculation may be based on a formula shown below, where N is equal to a sample size of the slice window, where μ is equal to the mean of all values in the sample data and xi is equal to the individual sample data. For example, the standard deviation of feature endpoint.egress.storage of data chunk 825 of FIG. is 24.0767503 which is the value of a standard deviation 925 of FIG. 9. The standard deviation of feature endpoint.egress.storage of data chunk 830 of FIG. 8 is 24.8407046 which is the value of a standard deviation 930 of FIG. 9.

$$\sigma = \sqrt{\frac{1}{N}\sum_{i=1}^{N}(x_i - \mu)^2}$$

At block 625, the method may generate a standard deviation series computed for each data chunk. The data chunk may be determined based on a pre-configured time interval basis such as hourly, daily, weekly, etc. For example, standard deviations may be calculated on a plurality of data chunks which may be used to generate a standard deviation pattern. The method proceeds to block 630 where the method determines if there is another feature to be analyzed. If there is a feature to be analyzed, then the method proceeds to block 610. If there is no feature to be analyzed, then the method proceeds to block 635, where an output generated based on the analysis may be stored in a data repository. The method ends.

FIG. 7 shows a feature set 700 that includes a set of features of a device type or device that may be generated by a feature engineering module such as feature engineering module 230 of FIG. 2. Feature set 700 includes a device type identifier 705, a feature set identifier 710, and a set of features 715. Here, device type identifier 705 is set to "DT-A" and feature set identifier 710 is set to "FS-A".

FIG. 8 shows a feature dataset 800 that includes a dataset associated with a device such as device 410 of FIG. 4 for analysis. Feature dataset 800 may be based on data collected/received from various devices that have been pre-processed and based on feature set 700 of FIG. 7. Feature dataset 800 includes a device identifier 805, a device type identifier 810, a feature set identifier 815, a set of features 820, a data chunk 825, and a data chunk 830. Here, device identifier 805 is set to "IOT-1234", device type identifier 810 is set to as "DT-A", and feature set identifier 815 is set to "FS-A". Device type identifier 810 is mapped to device type identifier 705 of FIG. 7. Feature set identifier 815 is mapped to feature set identifier 710 of FIG. 7. Set of features 820 is mapped to set of features 715 of FIG. 7. The dataset may be divided into various data chunks such as data chunk 825 and data chunk 830. Here, the dataset has been divided according to date/time. One of skill in the art may appreciate that the dataset may be divided according to other attributes.

FIG. 9 shows a standard deviation series 900 that includes calculated standard deviation values for various features of a plurality of data chunks. Standard deviation series 900 includes a device identifier 905, a device type identifier 910, a feature set identifier 915, a set of features 920, a standard deviation 925, a standard deviation 930, a standard deviation 935, and a standard deviation 940. Here, device identifier 905 is set to "IOT-1234", device type identifier 910 is set to as "DT-A", and feature set identifier 915 is set to "FS-A". Device type identifier 910 is mapped to device type identifier 810 of FIG. 8. Feature set identifier 915 is mapped to feature set identifier 815 of FIG. 8. Set of features 920 is mapped to set of features 820 of FIG. 8. The value of standard deviation 925 is calculated for feature endpoint.egress.storage of data chunk 825 of FIG. 8. The value of standard deviation 930 is calculated for feature endpoint.egress.storage of data chunk 830 of FIG. 8. The value of standard deviation 935 is calculated for feature endpoint.latency.eventhub of data chunk 825 of FIG. 8. The value of standard deviation 940 is calculated for feature endpoint.latency.eventhub of data chunk 830 of FIG. 8.

Figure 10:
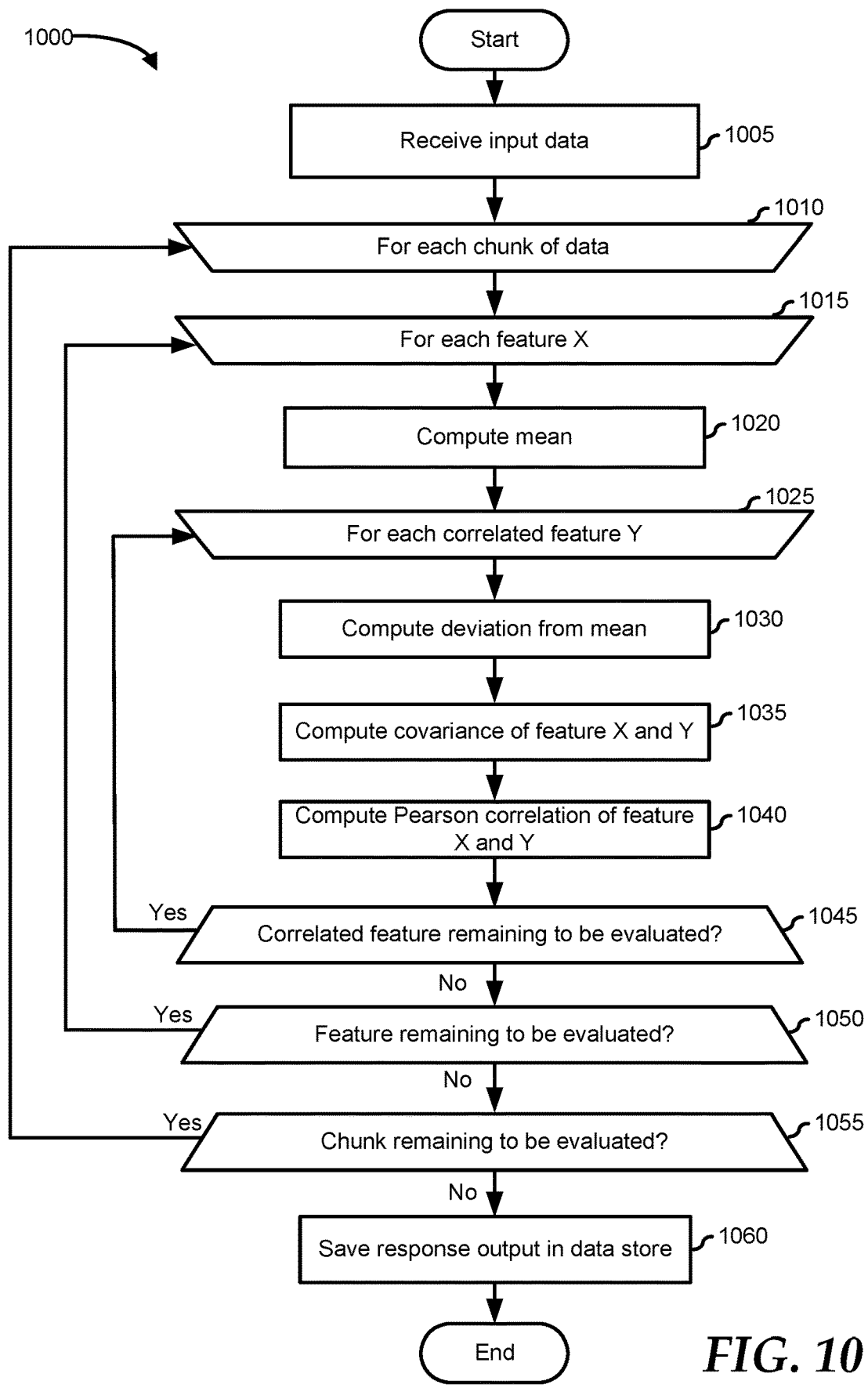
FIG. 10 is a flowchart illustrating a method for analyzing a dataset based on covariance and Pearson correlation method.

FIG. 10 shows a flowchart of method 1000 for analysis of the data collected using covariance and Pearson correlation. Method 1000 may be performed by multivariate analyzer 250 of FIG. 2 and typically starts at block 1005. While embodiments of the present disclosure are described in terms of one or more components of information handling system 220 of FIG. 2, it should be recognized that other systems may be utilized to perform the described method.

At block 1005, the method receives input data from the feature engineering module. In particular, the input data received may be similar to feature dataset 800 of FIG. 8. The input data may be structured, semi-structured, or unstructured. For example, the received input data may be in a comma-separated file format, in an extensible markup language (XML) based file format, a binary file format, etc. The input data may be grouped into chunks. The method may proceed to block 1010 where each chunk in the received input data is analyzed. Each chunk includes data associated with one or more features. The method may then proceed to block 1015 where each feature in the chunk of data is analyzed. The analysis includes calculating a mean for each feature in each chunk in block 1020. Each feature may also be correlated to another feature. The method may proceed to block 1025 where each correlated feature is analyzed. The analysis may include block 1030, block 1035, and block 1040.

At block 1030, the method calculates the deviation from the mean for each correlated feature. In one example, if the correlated features are equal to feature X and feature Y, then the calculation is performed using below formula where dfi is a deviation from the mean of feature X and feature Y, and $f_1$ is equal to the ith data element of feature X and feature Y. Here, µF is equal to the mean of feature X/feature Y.

$$dfx_i = fx_i - \mu FX$$

$$dfy_i = fy_i - \mu FY$$

At block 10, the method calculates the covariance of feature X and feature Y using a formula as shown below where n is equal to the length of the chunk data for each feature. The value of n is the same for each correlated feature that is being analyzed. The method proceeds to block 1040.

$$cv(X,Y) = 1/n \Sigma dfx_i \cdot dfy_i$$

At block 1040, the method calculates the Pearson correlation of feature X and feature Y using a formula as shown below where σX is equal to the standard deviation of feature X and σY is equal to the standard deviation of feature Y.

$$\rho = cv(X,Y)/(\sigma X * \sigma Y)$$

The method may proceed to block 1045 where it determines whether there is a remaining correlated feature to be analyzed. If there is a correlated feature to be analyzed, then the "YES" branch is taken, and the method proceeds to block 1025. If there is no remaining correlated feature to be analyzed, then the "NO" branch is taken, and the method proceeds to block 1050.

At block 1050, the method determines whether there is a remaining feature to be analyzed. If there is a feature to be analyzed, then the "YES" branch is taken, and the method proceeds to block 1015. If there is no remaining feature to be analyzed, then the "NO" branch is taken, and the method proceeds to block 1055.

At block 1055, the method determines whether there is a remaining chunk to be analyzed. If there is a chunk to be analyzed, then the "YES" branch is taken, and the method proceeds to block 1010. If there is no remaining chunk to be analyzed, then the "NO" branch is taken, and the method proceeds to block 1060 where the method stores the output generated by the analysis to a data repository. The method ends.

Figure 11:
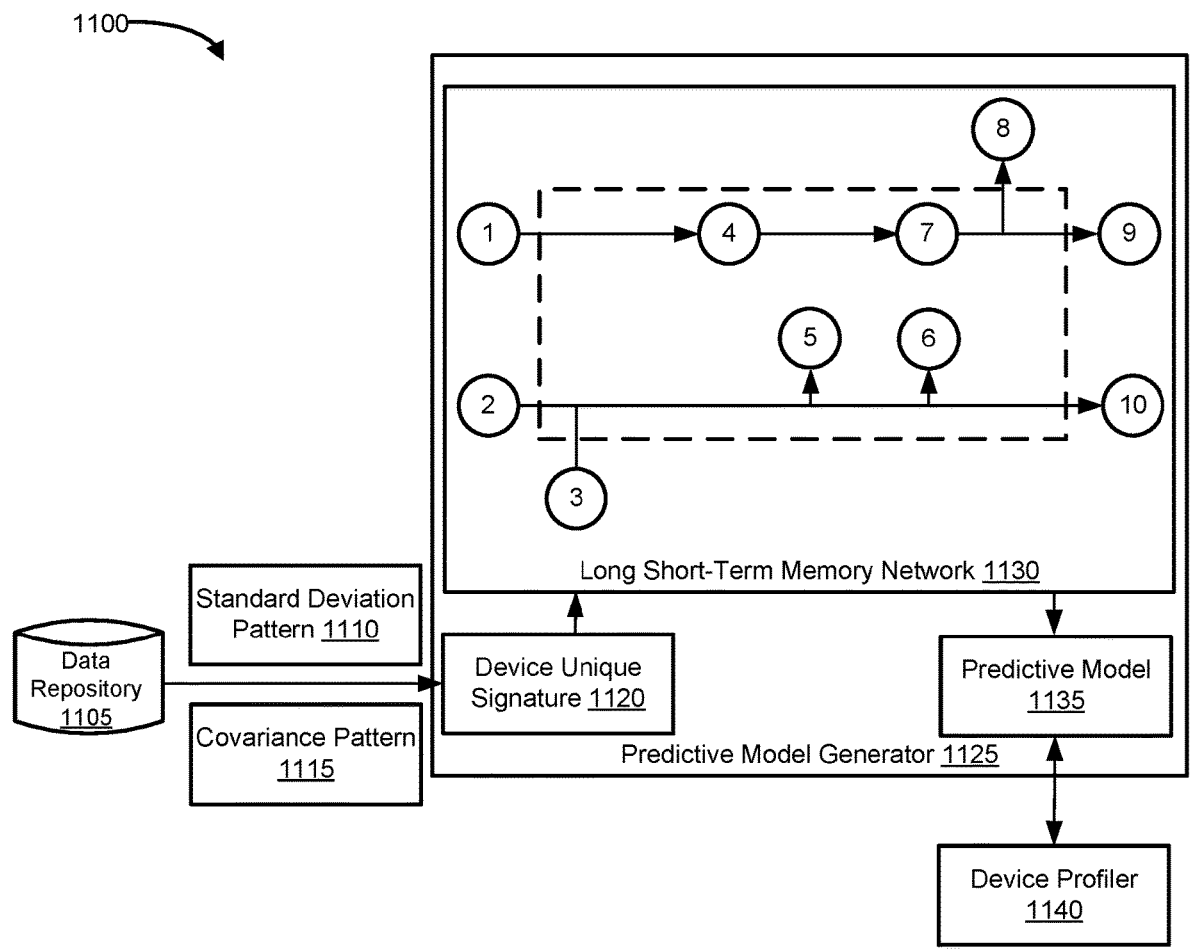
FIG. 11 is a block diagram illustrating a system for generating a predictive model.

FIG. 11 shows an environment 1100 which may be configured to analyze a device's runtime behavior. Environment 1100 may be a detailed illustration of block 340 of FIG. 3 and includes a predictive model generator 1125 that includes an LSTM neural network 1130. The analysis may be based on a device unique signature 1120 which is based on a standard deviation pattern 1110 and covariance pattern 1115 which may have been stored at data repository 1105. These patterns are combined as an ensemble to form device unique signature 1120. Environment 1100 uses a deep learning LSTM neural network 1130 to generate predictive model 1135 and/or train predictive model 1135. Predictive model 1135 may be used to generate a device profile for microsegmentation of devices in an IoT network based on the device's unique signature.

LSTM neural network 1130 may use device unique signature 1120 along with a feature dataset as input and outputs predictive model 1135. Predictive model 1135 may be used by device profiler 1140 for determining the device type of one or more devices for use in network microsegmentation of the IoT network. LSTM neural network 1130 may include a plurality of memory units also referred to as neurons. For example, LSTM neural network 1130 may include 256 or more neurons. LSTM neural network 1130 may be configured to use a dense output layer with a single neuron and a sigmoid activation function to make a prediction. LSTM neural network 1130 may also use the Adam algorithm for optimization.

A simplified illustration of LSTM neural network 1130 is shown which includes one or more neurons such as neurons 1 through 10. Neurons 1 to 3 represent input entities, while neurons 4 to 7 represent entities in an intermediate layer, and neurons 8 to 10 represent output entities. Neuron 1 represents a cell state for long term memory storage, neuron 2 represents a hidden state for short term memory storage, and neuron 3 represents an input cell. The intermediate layer is where decisions and learnings are made based on device unique signature 1120. Neuron 4 represents a forget gate or filter which decides which information from neuron 1 should be thrown away or kept. Neuron 5 represents a sigmoid activation function which decides which information is important to keep from a tan h output. Neuron 6 represents a tan h function that is used to regulate the values flowing through LSTM neural network 1130. The tan h function squishes values to always be between −1 and 1. Neuron 7 combines output from neuron 4 and neuron 6. Neuron 8 represents a model output that includes a class prediction value, while neuron 9 represents a resultant new cell state for long term memory storage and neuron 10 represents a resultant hidden state for short term memory storage. Although a simplified illustration of LSTM neural network 1130 has been described in detail, one with skill in the art appreciates that many modifications of LSTM neural network 1130 are possible without departing from the intended scope of the present disclosure.

Figure 12:
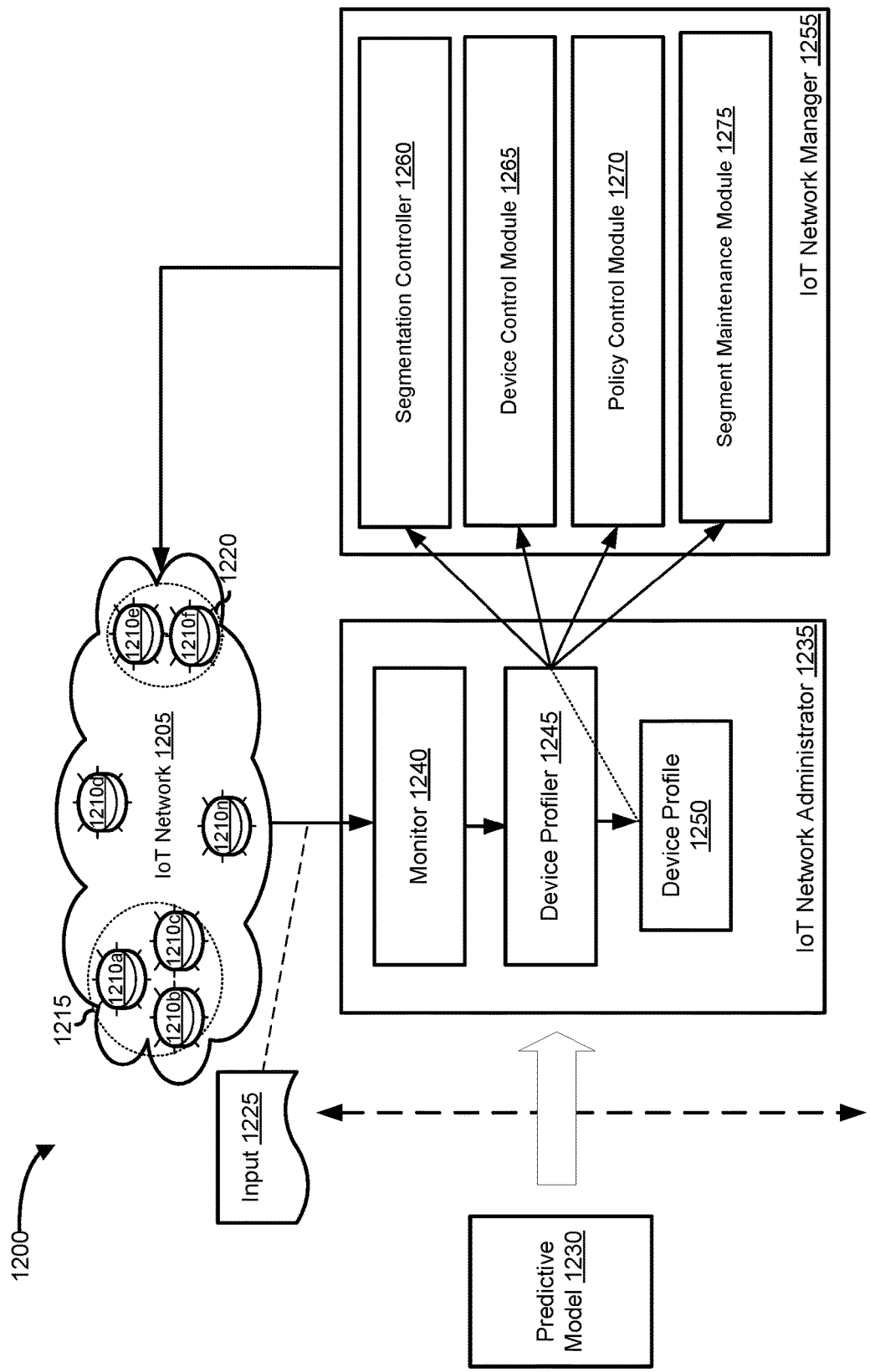
FIG. 12 is a block diagram illustrating a system for Internet of Things (IoT) network microsegmentation using device profiles.

FIG. 12 shows a diagram of an environment 1200 which monitors and manages an IoT network. Environment 1200 includes IoT network 1205, IoT network administrator 1235, and IoT network manager 1255. IoT network administrator 1235 includes monitor 1240 and device profiler 1245. IoT network administrator 1235 uses trained predictive model 1230 to generate a device profile 1250 which may be used by IoT network manager 1255 in managing and/or controlling the devices in IoT network 1205. Device profile 1250 may be used to predict device identity and/or device type based on device feature sets.

IoT network 1205 may include a pool of devices such as devices 1110*a* to 1110*n*. The devices in IoT network 1205 may be grouped into segments and/or microsegments. For example, IoT network 1205 includes a segment 1215 and a segment 1220. Segment 1215 includes devices 1210*a* to 1210*c*. Segment 1220 includes devices 1210*e* and 1210*f*. IoT network administrator 1235 may be configured to receive predictive model 1230 from a learning system similar to learning system 240 of FIG. 2.

Monitor 1240 may be configured to monitor, collect, and/or receive data such as input 1225 from various devices in IoT network 1205. For example, monitor 1240 may detect the addition, removal, or change to a device in IoT network 1205. The data may be transmitted to device profiler 1245 which may use it to determine and/or predict the device or device type in real-time based on the trained model. IoT network administrator 1235 may be configured to identify a device with real-time device analysis.

IoT network manager 1255 may be configured to determine device vulnerabilities, risks, and other characteristics of the device based on device profile 1250 which is an output of device profiler 1245. IoT network manager 1255 may use the determined vulnerabilities and other characteristics of the device to determine the current level of security status of the device and accordingly apply a security policy. The security policy may be used to update security in IoT network 1205 such as to leverage it in performing microsegmentation of the devices in IoT network 1205. For example, if device 1210*d* is added to IoT network 1205, IoT network administrator 1235 may collect data associated with device 1210*d* to determine its device type and other characteristics which may be used by IoT network manager 1255 to determine whether device 1210*d* should be allowed in the network and/or if allowed which segment it should belong if any. IoT network manager 1255 may also determine whether device 1210*d* is authorized to be added to IoT network 1205. For example, even if device 1210*d* presents a spoofed certificate that is "valid", IoT network 1205 may perform additional verification based on the determined device profile and/or runtime behavior. Thus, even if the certificate presented is "valid", IoT network manager 1205 may reject device 1210*d* based on the device profile which may not match historical data. Hence, improving the security of IoT network 1205 by adding another security layer.

IoT network manager 1255 may include one or more modules and/or controllers to perform various functions. For example, IoT network manager 1255 includes a segmentation controller 1260, a device control module 1265, a policy control module 1270, and a segment maintenance module 1275. One of skill in the art will appreciate that IoT network manager 1255 may include additional functions and/or modules. Segmentation controller 1260 may be configured to perform granular isolation and microsegmentation based on various factors such as device type, threat levels, usage patterns, etc. Device control module 1265 may be configured to perform granular unit control of the devices based on security policies. The granular unit control of the devices may be based on the tasks or behavior associated with the devices. Policy control module 1270 may be configured to control the IoT devices based on centralized ubiquitous security policy. For example, if there is a break in the firewall, IoT network manager 1255 may be able to apply security policies based on the current runtime behavior of the devices and/or segment to contain and/or fix the break inside a perimeter by stopping the lateral movement of the exploit. Segment maintenance module 1275 may be configured to perform proactive and/or reactive maintenance of the devices and/or segments of IoT network 1205.

Although FIG. 3, FIG. 6, and FIG. 10 show example blocks of method 300, method 600, and method 1000 in some implementation, method 300, method 600, and method 1000 may include additional blocks, fewer blocks, different blocks, or differently arranged blocks than those depicted in FIG. 3, FIG. 6, and FIG. 10. Additionally, or alternatively, two or more of the blocks of method 300, method 600 and method 1000 may be performed in parallel. For example, block 620 and block 625 of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor, data from a device within a network, wherein the data is associated with one or more features of the device;
determining a subset of the features of the device that is associated with a runtime behavior of the device;
performing a univariate analysis on a feature dataset that is associated with the subset of the features of the device;
performing a multivariate analysis on the feature dataset that is associated with correlated features in the subset of the features, wherein the multivariate analysis includes a covariance analysis with Pearson correlation method;

generating a device signature based on the univariate analysis and the multivariate analysis;

generating a predictive model based on the device signature, wherein the predictive model is trained on historical data of devices in the network;

generating a device profile based on the predictive model that may be used to determine a device type and the runtime behavior of the device; and determining a segment of the network associated with the device based on the device type and the runtime behavior of the device.

2. The method of claim 1, wherein the univariate analysis includes standard deviation analysis.

3. The method of claim 1, wherein the historical data were collected prior to the multivariate analysis.

4. The method of claim 1, wherein the predictive model is generated based on a long short-term memory analysis.

5. The method of claim 1, further comprising determining a correlation between a first feature and a second feature of the subset of the one or more features.

6. The method of claim 1, further comprising determining a security status of the device based on the device profile.

7. The method of claim 6, further comprising determining a security policy based on the device profile and the security status of the device.

8. The method of claim 7, further comprising applying the security policy to the segment of the network.

9. The method of claim 7, further comprising monitoring the devices in the network.

10. An information handling system, comprising:

a hardware processor; and a memory device accessible to the hardware processor, the memory device storing instructions that when executed perform operations, the operations including:

receiving data from a device within a network coupled to the information handling system, wherein the data is associated with one or more features of the device;

performing a univariate analysis on the data that is associated with a subset of the features of the device, wherein the subset of the features of the device is associated with a runtime behavior of the device;

performing a multivariate analysis on the data that is associated with correlated features in the subset of the features;

generating a device signature based on the univariate analysis and the multivariate analysis;

performing a deep learning analysis on the data based on the device signature and a predictive model trained on the data;

generating a device profile based on the predictive model and the device signature, wherein the device profile is associated with a device type; and determining a segment of the network based on the device type.

11. The information handling system of claim 10, the operations further comprising determining a correlation between a first feature and a second feature of the subset of the one or more features.

12. The information handling system of claim 10, the operations further comprising determining a security status of the device based on the device profile.

13. The information handling system of claim 12, the operations further comprising determining a security policy based on the device profile and the security status of the device.

14. The information handling system of claim 13, the operations further comprising applying the security policy to the network.

15. A non-transitory computer-readable medium including code that when executed performs a method, the method comprising:

receiving data from a device within a network, wherein the data is associated with one or more features of the device;

performing a univariate analysis on the data associated with a subset of the features of the device, wherein the subset of the features of the device is associated with a runtime behavior of the device;

performing a multivariate analysis on the data associated with correlated features in the subset of the features, wherein the multivariate analysis includes a covariance analysis with Pearson correlation method;

generating a device signature based on the univariate analysis and the multivariate analysis;

generating a predictive model trained on historical data, wherein the predictive model is based on the device signature;

generating a device profile based on the predictive model and the data received from the device, wherein the predictive model is associated with a device type; and determining a microsegment of the network based on the device type.

16. The non-transitory computer-readable medium of claim 15, wherein the univariate analysis includes a standard deviation analysis.

17. The non-transitory computer-readable medium of claim 15, wherein the historical data were collected prior to the multivariate analysis.

18. The non-transitory computer-readable medium of claim 15, wherein the predictive model is generated based on a long short-term memory analysis.

19. The non-transitory computer-readable medium of claim 15, wherein the univariate analysis generates a standard deviation pattern.

20. The non-transitory computer-readable medium of claim 15, wherein the multivariate analysis generates a covariance pattern.

* * * * *